Jan. 23, 1945. R. W. BROWN 2,367,817
VEHICLE SUSPENSION
Filed Sept. 13, 1939 7 Sheets—Sheet 5
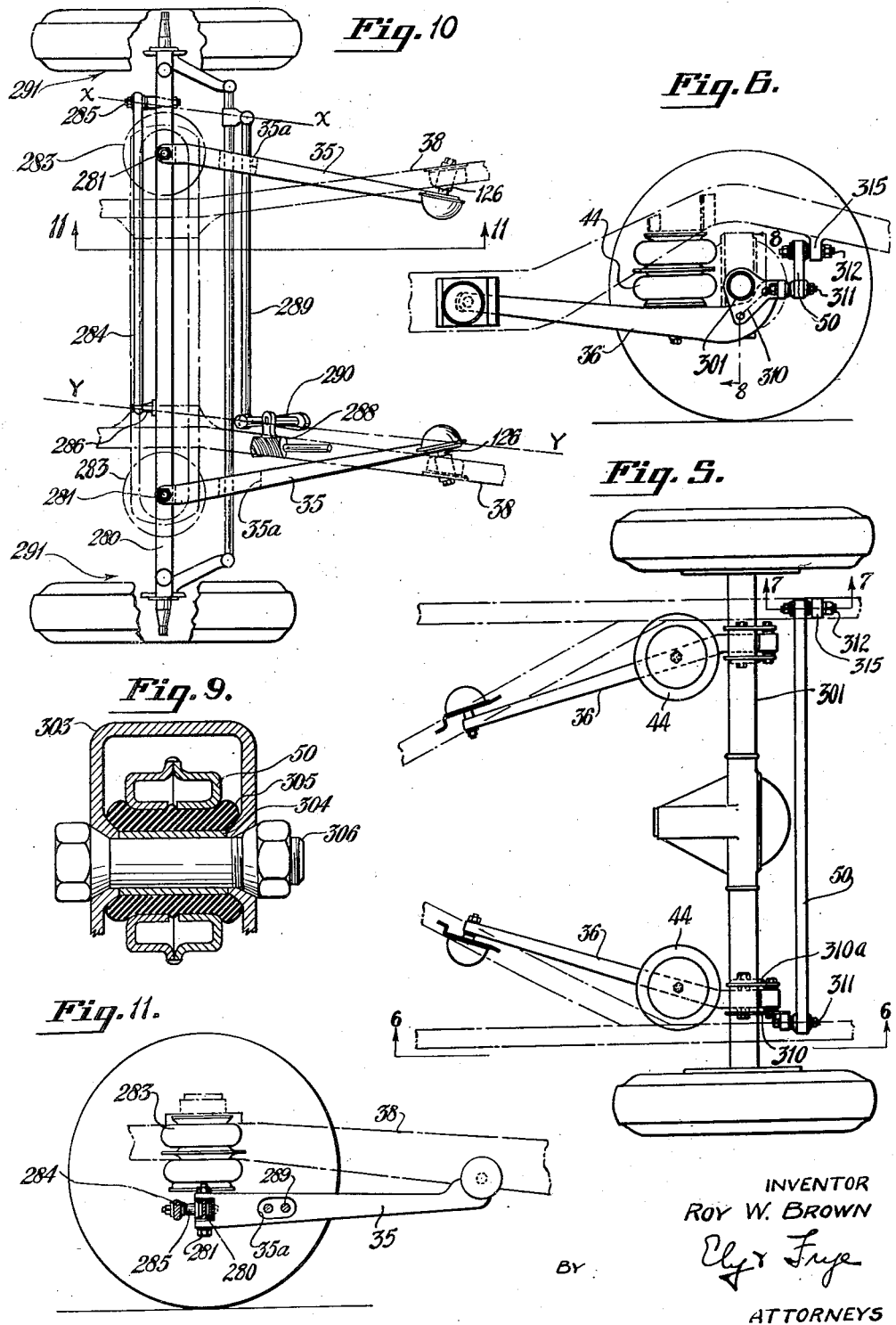
INVENTOR
ROY W. BROWN
BY
ATTORNEYS

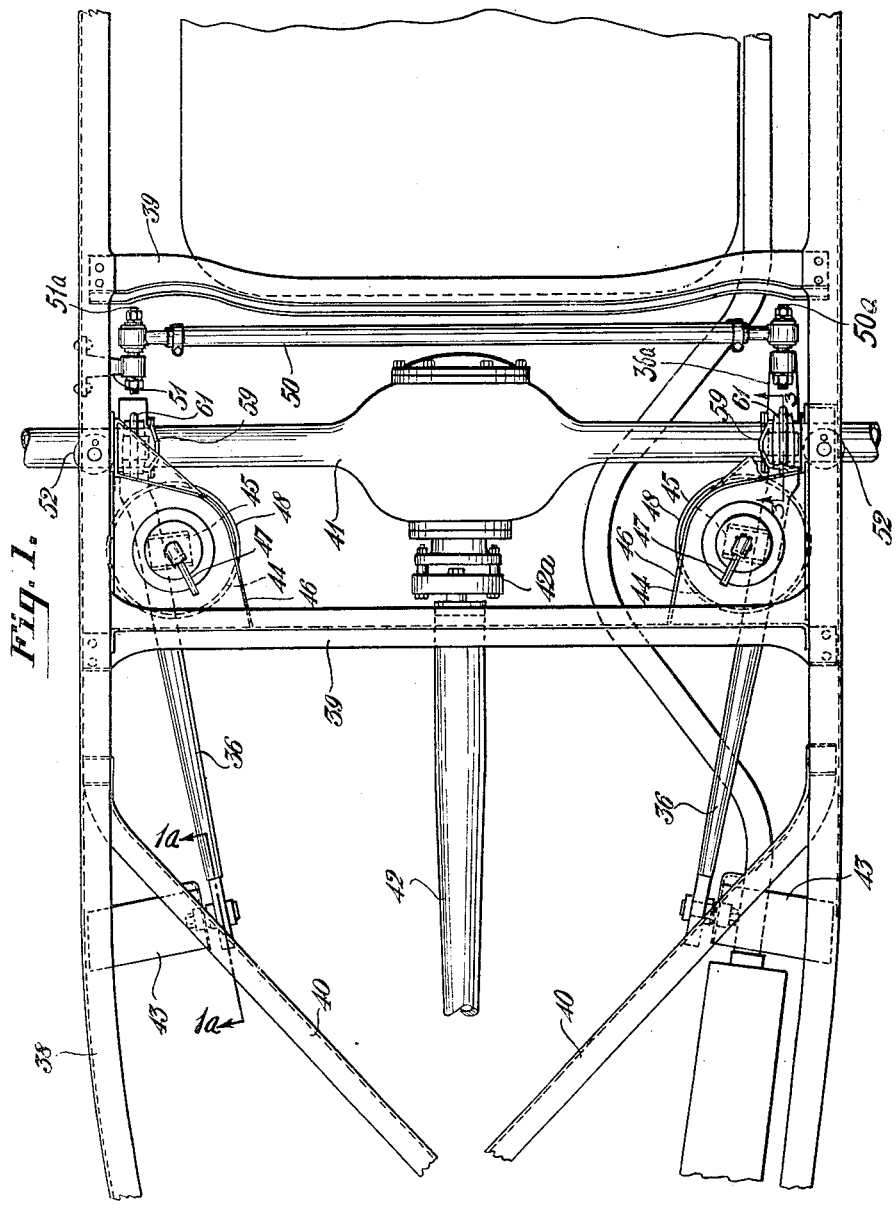

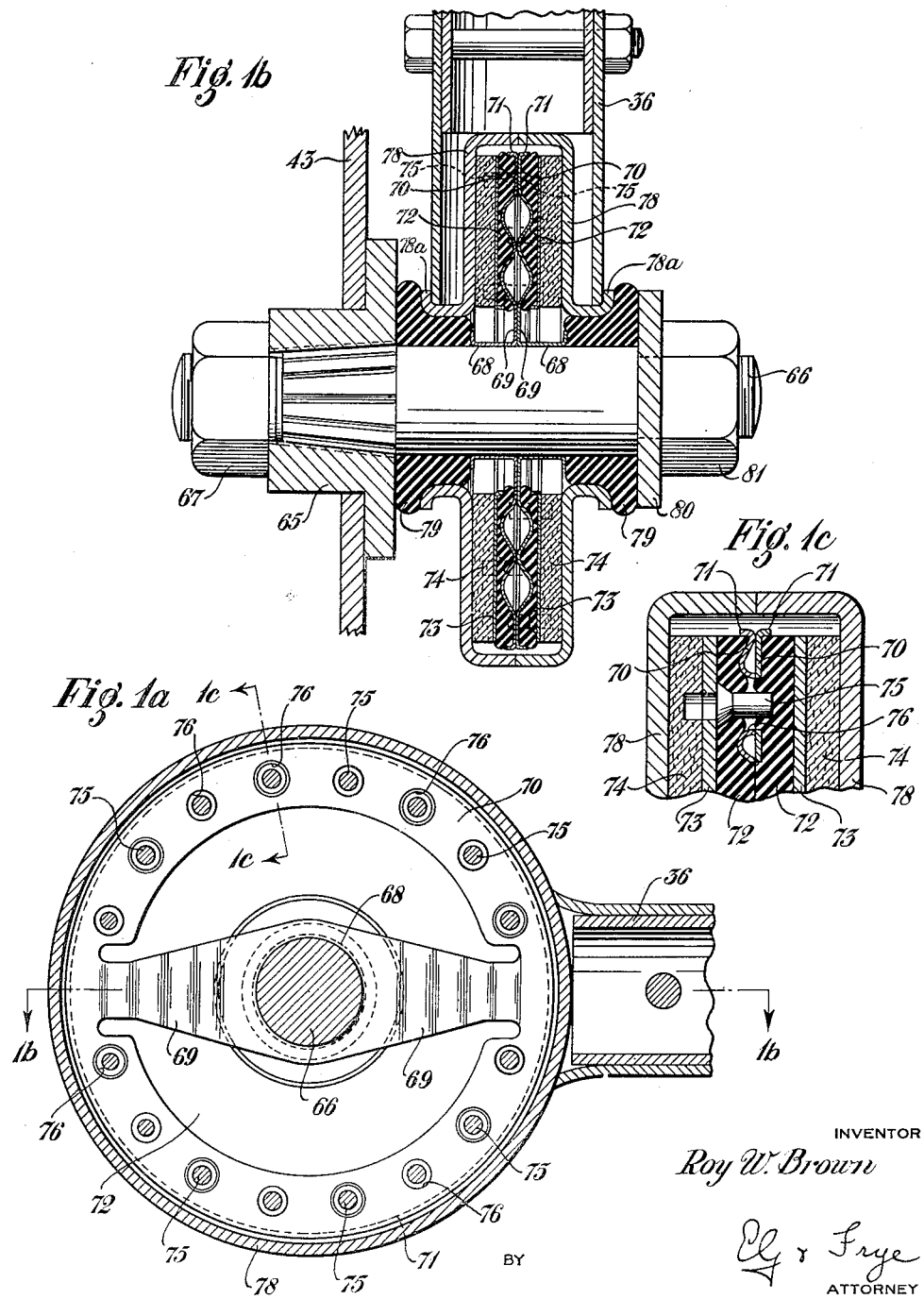

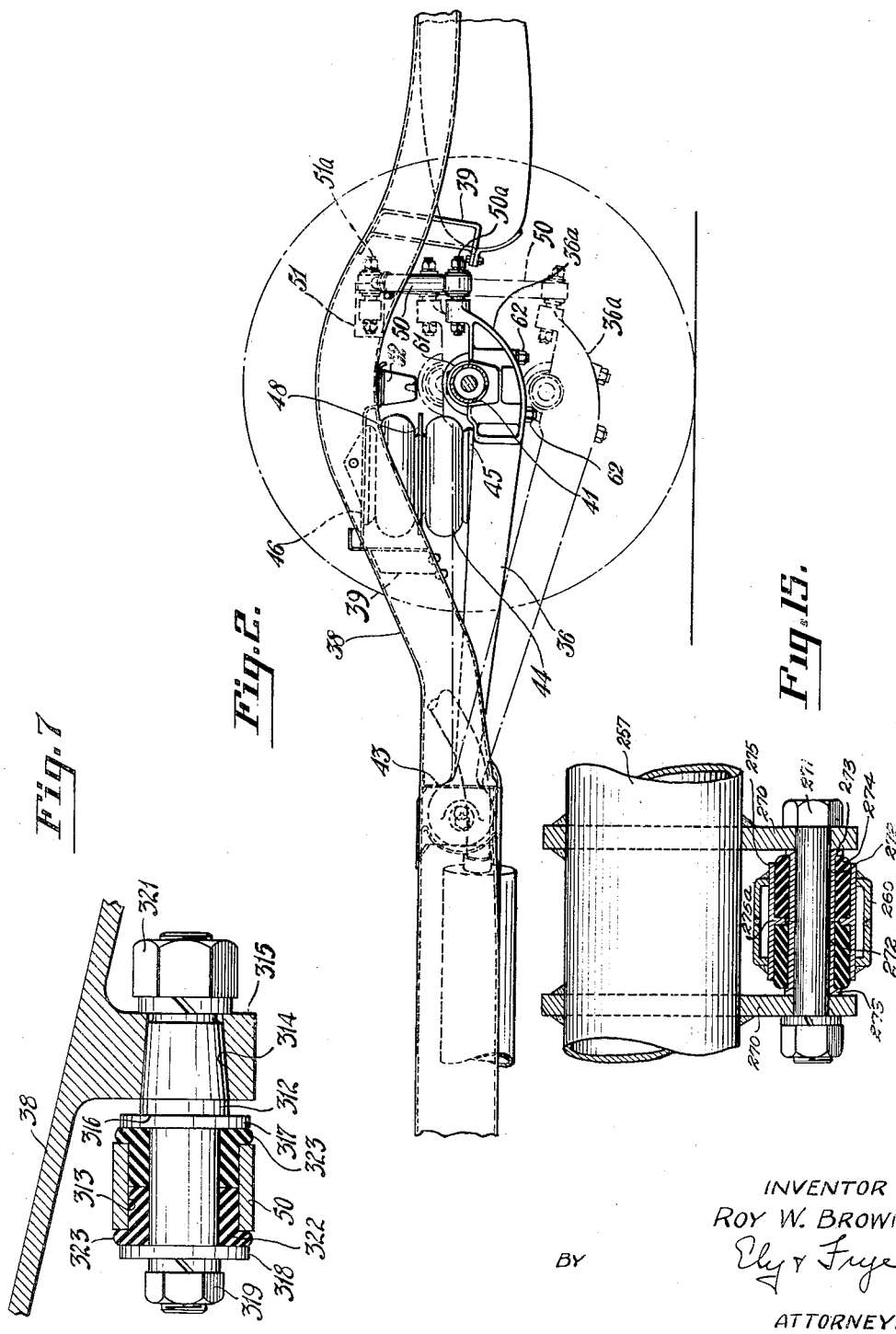

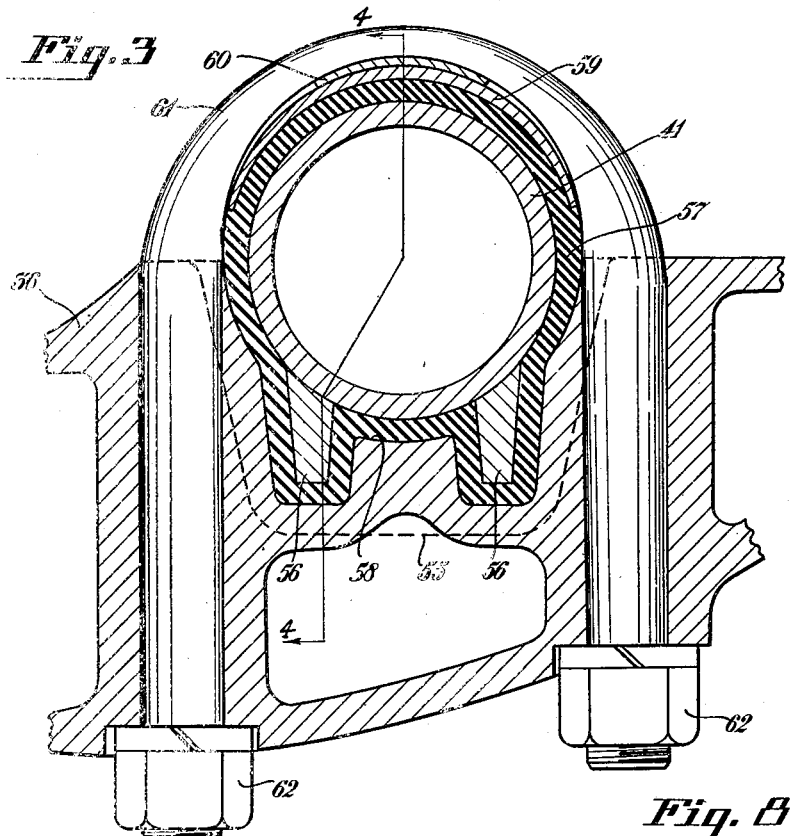
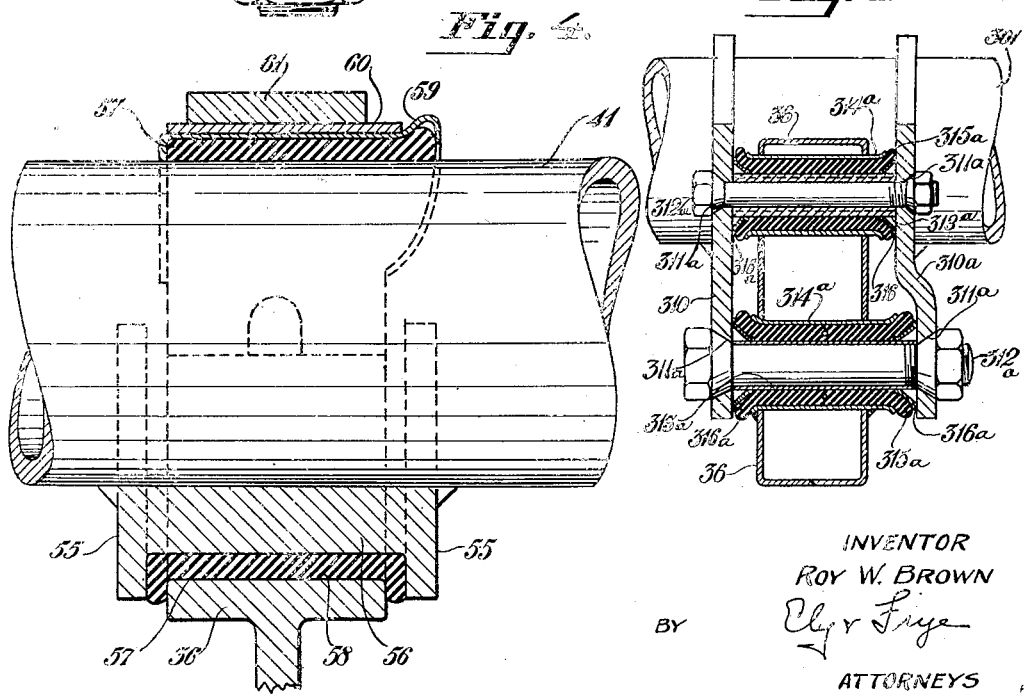

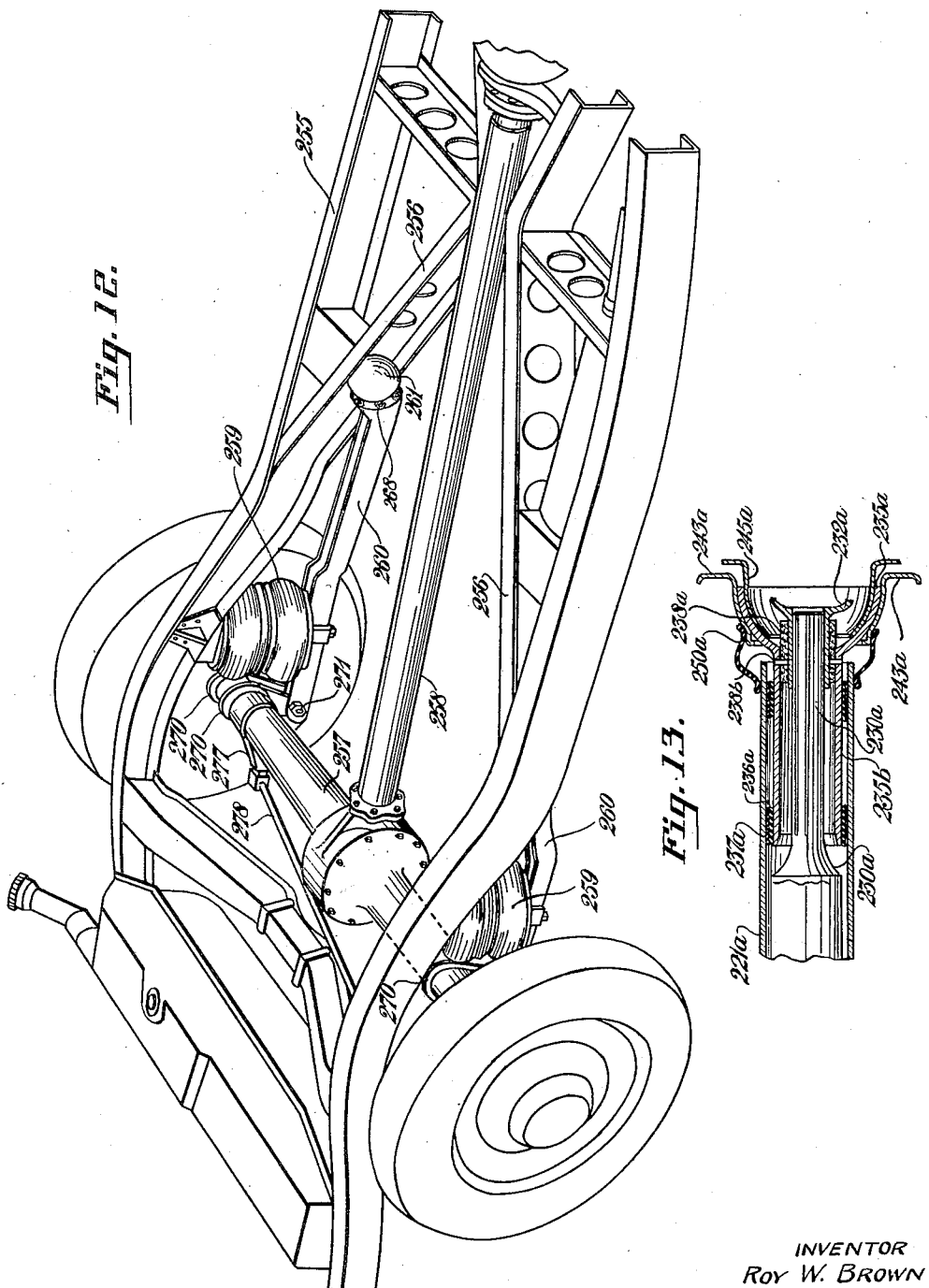

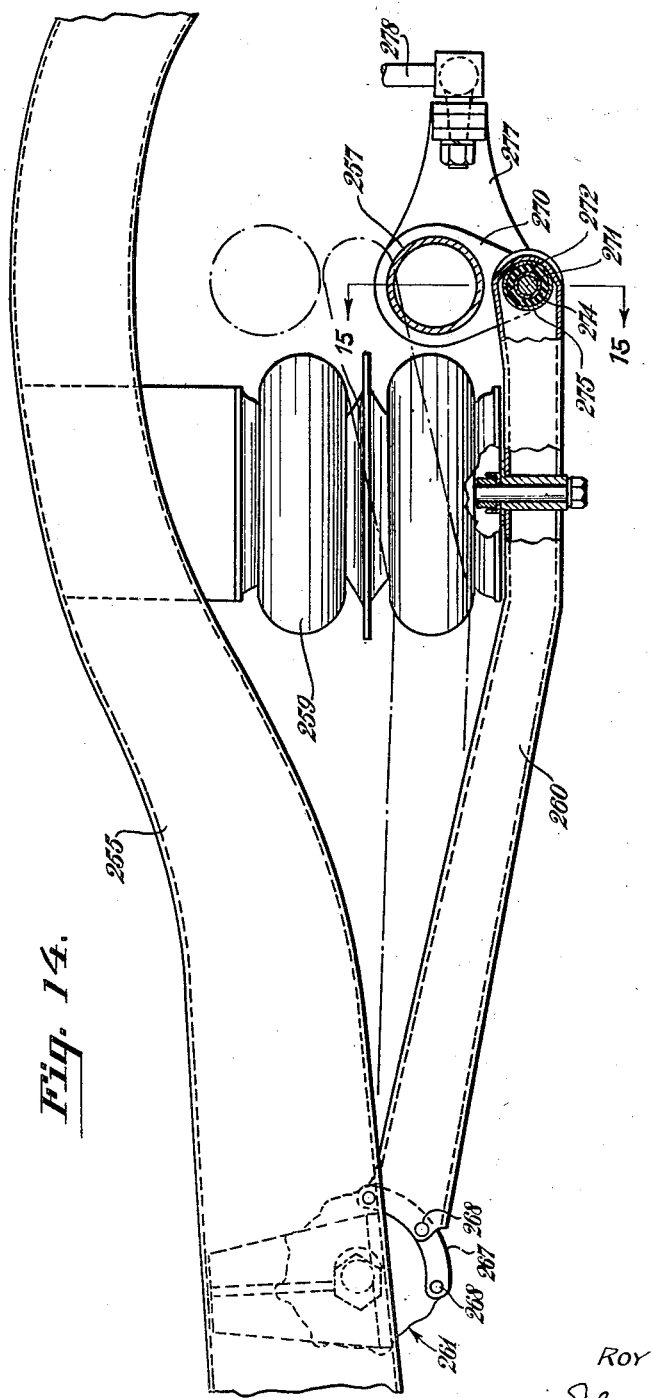

Patented Jan. 23, 1945

2,367,817

UNITED STATES PATENT OFFICE 2,367,817

VEHICLE SUSPENSION

Roy W. Brown, Akron, Ohio, assignor to The Firestone Tire & Rubber Company, Akron, Ohio, a corporation of Ohio Application September 13, 1939, Serial No. 294,663

17 Claims. (Cl. 180—73)

This invention relates to vehicle suspensions, and more especially it relates to improved mechanism interposed between the running gear and the frame or body of a vehicle for controlling movement of said running gear relatively of said frame or body, under actual operating conditions.

The invention is of primary utility in combination with resilient vehicle suspensions having no inherent friction and/or no lateral stability. Thus it may be used advantageously with coiled spring suspensions, or with pneumatic suspensions. It is the latter type of suspension that is employed in the illustrative embodiment of the invention herein depicted.

The advent of soft suspensions in modern motor vehicles, for the purpose of increasing riding comfort, has raised new problems for the reason that soft springs provide unstable suspensions, thus requiring the addition of some suitable stabilizing, or positioning mechanism to retard movement of the body relatively to the running gear. Such means should produce low body frequency and low vertical accelerations of the body of the vehicle even when the running gear is subjected to high frequency shocks. Also, it is important that the means smoothly control all lateral or longitudinal movement of the body on the running gear.

One object of the invention is to provide means for maintaining the running gear and frame or body in certain relative fixed relation while permitting, but resiliently opposing, certain other relative movements.

Another object is to insulate the noise incident to the comparatively high frequency mechanical vibrations of the tires and running gear from the body or frame.

Another object is to provide means for resiliently opposing the tendency of the body to roll when the vehicle is driven around curves, without at the same time appreciably nullifying the advantages of the soft suspension.

Another object is to provide a vehicle suspension in which means are provided for resiliently supporting the body or frame on the running gear and in which separate means are provided for taking the thrust and torque reactions of the running gear, the latter means being connected with the running gear or frame through rubber connections in such a manner that the relative pivotal movements between the body and running gear along an axis generally longitudinal of the vehicle will be resiliently resisted without substantially affecting the rate of the suspension for relative straight vertical movements and while at the same time the noise from the tires and running gear will be effectively insulated from the frame or body.

The chief objects of the invention are to provide a vehicle suspension whereby stability of the body is maintained while at the same time maintaining the low rate of the suspension; other objects will be manifest as the specification proceeds.

In accordance with the invention, stabilizing mechanism and thrust-translating devices connect the body or frame of the vehicle with the running gear thereof, these devices being subjected to various strains arising from relative movement of said body and running gear and being adapted to retard or control such movement.

The invention will be described with particular reference to the accompanying drawings in which:

Figure 1 is a fragmentary plan view of the running gear and frame of a motor vehicle having a Hotchkiss type rear axle, and one embodiment of the improved vehicle suspension operatively associated therewith;

Figure 1a is a section on line 1a—1a of Figure 1, showing the details of the pivotal connection between the torque rod and the frame;

Figure 1b is a section on the line 1b—1b of Figure 1a;

Figure 1c is a section on the line 1c—1c of Figure 1a;

Figure 2 is a side elevation of the structure shown in Figure 1;

Figure 3 is a section on the line 3—3 of Figure 1;

Figure 4 is a section on the line 4—4 of Figure 3;

Figure 5 is a fragmentary plan view of a vehicle having a Hotchkiss drive and having the suspension system of the invention applied to the rear wheels thereof;

Figure 6 is a vertical section taken on line 6—6 of Figure 5;

Figure 7 is a sectional elevation on line 7—7 of Figure 5;

Figure 8 is a detail vertical section taken on line 8—8 of Figure 6, showing the manner of attaching the torque rod to the axle assembly;

Figure 9 is a detail section showing a modified form of bracket and connecting means for attaching the respective ends of the stabilizer rod to the frame and running gear of the vehicle;

Figure 10 is a fragmentary plan view of the front wheel assembly of a vehicle in which an embodiment of the suspension system of the invention is applied thereto;

Figure 11 is a vertical section on line 11—11 of Figure 10;

Figure 12 is a perspective view of the rear end of an automobile frame and running gear, and another embodiment of the improved suspension operatively associated therewith;

Figure 13 is a diametric, horizontal section of a universal slip joint and friction producing device for use with the suspension shown in Figure 12;

Figure 14 is a side elevation of a portion of the structure shown in Figure 12, parts being broken away and in section; and Figure 15 is a section on the line 15—15 of Figure 14.

This application is a continuation-in-part application of my co-pending application Serial No. 236,693, filed October 21, 1938.

Referring to Figures 1 and 2 of the drawings, there is shown the rear end portion of a vehicle frame 38 that comprises transverse braces 39, 39 and obliquely disposed cross-braces 40, 40. The axle housing of a live axle is shown at 41, the vehicle drive being shown as a propeller shaft 42 connected to a universal joint 42a immediately in front of said axle. Torque or distance rods 36 are pivotally connected to the axle housing 41 adjacent the respective ends thereof, the other ends of said torque rods being pivotally connected to the frame 38, at opposite sides of the latter, upon respective brackets 43 that are secured to the side-rails of said frame and to the cross-braces 40 thereof.

The pivotal connection between the other end of a torque rod 36 and the frame 38 comprises friction-producing means, one embodiment of the latter being shown in Figures 1a to 1c. The details of the friction device are described in my co-pending application S. N. 236,693, filed October 24, 1938. All of the subject matter of this application, except that of Figure 7, is common with the aforesaid application S. N. 236,693. As shown in said figures, the bracket 43 carries an annular flanged bushing 65 having a tapered axial aperture in which is splined a spindle 66 that is secured therein by a nut 67. Secured to the medial region of the spindle, as by welding, are abutting sheet metal collars 68, 68, each of which is formed with outwardly extending, diametrically disposed arms 69, 69, the outer ends of which are integral with respective rings 70, 70, the latter abutting each other in face to face relation and having their perimeters formed with laterally extending flanges 71, 71, the flange of one ring extending in the opposite direction to the flange of the other ring. Preferably the arms 69 are transversely corrugated as shown to provide resilience and strength thereto. Interposed between the rings 70 and arms 69, and the metal plates 73, are respective annular discs or rings 72 of resilient rubber composition. Mounted upon the outer lateral face of each metal plate 73, and coextensive therewith, are discs of friction material 74. The discs 74 are connected to the respective metal plates 73 through the agency of studs 75, 75 that extend through said plates and into recesses in the friction material, as is most clearly shown in Figure 8. The studs 75 also extend through the adjacent rubber disc 72, through aligned openings 76 formed in the abutting metal rings 70, and terminate in respective recesses formed in the other rubber disc 72. The studs 75 are arranged in a circumferential series, every other stud of which is associated with the same plate 73 and rubber disc 72, the intermediate studs being associated with the other plate 73 and rubber disc.

The structure described is confined within an annular housing consisting of dished metal members 78, 78 that are united along a circumferential seam, as by welding, at their outer circumference. The space between the members 78 is less than the normal thickness of the structure enclosed therein so that the rubber discs 72 are put under compressive strain, with the result that the friction discs 74 are strongly urged into face to face engagement with the inner lateral surfaces of the members 78. At the inner circumference of the housing the members 78 are formed with respective outwardly and axially extending flanges 78a, 78a that are concentric with the spindle 66 and in spaced relation thereto. Between the flanges 78a and the spindle 66 are respective bushings 79, 79 of resilient rubber, which bushings extend radially outwardly around said flanges. One of the ruber bushings 79 abuts the flanged mounting bushing 65. The other rubber bushing 79 is engaged by a washer 80 on the spindle 66, which washer is backed by a nut 81. When said nut 81 is tightened both rubber bushings 79 are put under axially directed compressive strain that causes the bushings to have strong frictional engagement with the housing flanges 78a. The torque rod 36 is secured to the housing by being welded to the flanges 78a thereof, as shown in Figure 6.

The arrangement is such that when the torque arm 36 oscillates about the spindle 66 as an axis, because of relative vertical movement between the frame 38 and the running gear, the housing consisting of the plates 78 will turn angularly, relatively of the friction discs 74, whereby the said relative movement is opposed by the friction therebetween. The rubber discs 72 maintain the friction discs 74 in engagement with the housing elements at all times, and shearing strains upon the rubber discs, due to angular movement of plates 73, will be limited due to the relatively small clearance between the studs 75 and the margins of the apertures 76 in rings 70 through which said studs extend. Angular movement of the torque rod 36 relatively of the spindle 66 also imposes a torsional stress upon the rubber bushings 79, which stress urges the various elements back to normal position when the force applied to the connection by the torque rod is removed. Because of the flexibility of the metal discs within the device, and the resilience of the bushings 79, the device is enabled yieldingly to resist other angular movements that may arise between the torque arm 36 and the vehicle frame, although friction is present only when such movement is in a single plane, as previously explained.

The rubber which is forced into the apertures 76 and around the studs 75 and the rubber bushings 79 serves to reduce the transmission of mechanical vibrations from the torque arms 36 to the vehicle body.

The distortable resilient bushing at both ends of the torque rods 36 provides an anti-roll construction whereby relative angular movements between the body or frame and the running gear along an axis generaly longitudinal of the vehicle will be resiliently opposed. These bushings also permit universal relative movements at the points of connection. The rolling of the body is resiliently resisted by the bushings through torsional strains in the rubber as well as by relative pivotal movements about the longitudinal axes of the rods 36 which also develop compression stresses in the bushing.

Positioned between the frame 38 and the torque rods 36, adjacent the axle housing 41, are respective bellows members 44, 44 that constitute the deformable elements of a pneumatic suspension system. At its lower end each bellows 44 seats upon a bracket 45 carried by a torque rod 36, and at its upper end the frame is yieldingly supported by the torque rods 36 through the agency of said bellows. At the top of each bellows is a pipe or conduit 47 that connects the interior of the bellows with a reservoir (not shown) of determinate volumetric capacity, there being a suitable valve (not shown) in said conduit by which the rapidity of air flow between the reservoir and bellows, upon compression or elongation of the latter, is controlled. As shown, each bellows has a girdle ring 48 about its constricted medial region for the purpose of increasing the rate of the bellows as the latter is compressed. A pneumatic suspension of the character described has a low rate when the bellows is partly compressed by the weight of the vehicle body and normal load carried thereby, so that it provides a soft ride under normal conditions. The rate increases, however, when the bellows is compressed to a greater extent than under normal conditions, or when elongated by rebound after greater than normal compression, with the result that "bottoming" is prevented and rebound is substantially subdued and rapidly damped out.

As shown in Figures 1 and 2, one of the torque rods 36 has a bracket-like portion 36a that extends rearwardly of the axle housing 41, the torque rod being pivotally connected to the housing by a U-shaped clamp 61. The portion 36a of the torque rod has one end of a transversely disposed stabilizer rod 50 secured thereto by a spindle 50a the other end of said stabilizer rod being pivotally connected to a bracket 51 secured on the frame 38, on the opposite side thereof from the particular torque rod 36 by a spindle 51a. The pivotal connections at the opposite ends of the stabilizer rod 50 are of the ball and socket type and preferably have socket members consisting of rubber under compression. In all events, the stabilizer rod 50 is resiliently mounted for limited universal movement on the spindles 50a and 51a. Substantially all of the movement of the stabilizer rod 50 is arcuate with relation to the axis of the spindle 50a, but upon vertical movement of the running gear relative to the frame, the stabilizer moves in a slight arc with relation to the fixed connection between the running gear and the frame, such as the bracket 43 by which the torque rod 36 is mounted. The function of the stabilizer rod is solely to prevent lateral displacement of the frame 38 relatively of the running gear of the vehicle, or in other words, to position the frame on the running gear and to retain it in given relationship and for obtaining this result, slight universal movement of the stabilizer rod must be permitted when a fixed connection between the running gear and frame is made. Mounted upon the under side of each side rail of the frame 38, directly over the axle housing 41, is a rubber bumper 52 that yieldingly limits the distance that the axle housing and frame may approach each other.

Each torque rod 36 is connected at one of its ends to the axle housing 41, adjacent one of the ends of the latter, which connections are somewhat yielding, reference being directed to Figures 3 and 4 wherein one of these connections is shown in detail. As shown in said figures, the under side of the axle housing 41 has a pair of spaced apart metal flanges 55, 55 secured thereto as by welding, said flanges being connected to each other by a pair of parallel webs 56, 56 that project downwardly, substantially radially of said housing and parallel to the axis thereof. Encircling the axle housing, between the pair of flanges 55, is a bushing or sleeve of resilient rubber composition 57, said bushing also covering the webs 56 in conformity to the profile thereof. The upper margin of the torque rod 36, which is somewhat narrower than the space between flanges 55, is formed with a recess 58 in which the lower half of the bushing 57 is received. Upon the upper part of the bushing is an arcuate sheet metal saddle 59, and mounted upon the latter, in the medial region thereof, is a somewhat smaller, arcuate plate 60. The inverted U-shaped clamp 61 has its arcuate medial portion bearing against plate 60, the respective legs of the clamp extending downwardly through the torque rod 36. Nuts 62 on the respective ends of the clamp are provided for tightening the latter so as to impose a compressive strain upon the rubber bushing 57. Under compressive strain the rubber of the bushing 57 may be displaced laterally into the space between the torque rod and the flanges 55, and may flow laterally under the saddle 59, the respective lateral margins of the latter being inturned, as shown in Figure 4, to protect the lateral margins of the deformed bushing upon the top of the housing.

The arrangement is such that angular movement of the axle housing 41 about its axis relatively of the torque rods 36 is strongly resisted by those parts of the bushings 57 that are disposed between the webs 56 and torque rods, by reason of the resistance to compression of said bushing parts. The bushings 57 offer less resistance to compression in planes parallel to their axis and consequently yieldingly permit relative angular movement of the axle housing and the torque rods such as results when one end of the axle is nearer the frame than the other, which condition arises when one wheel only strikes a bump or drops into a depression in the roadway. These bushings also permit universal relative movement at the points of connection. The rolling of the body is resiliently resisted by the bushings through torsional strains in the rubber as well as by relative pivotal movements about the longitudinal axes of the rods 36 which also develop compression stresses in the bushing.

Turning now to Figure 5, a stabilizer rod 50 is secured on a vehicle having a Hotchkiss drive and torque arms 36.

Figure 6 shows generally the assembly of the torque rod 36 and stabilizer rod 50 to a rear axle 301 of the Hotchkiss drive. A bracket 310 having a drilled bossed portion 310b on the axle 301 secures both the torque and stabilizer rods to the axle. Again the stabilizer rod is resiliently mounted on a pin 311 in said drilled bossed portion for limited universal movement with relation to the axle.

A section through the stabilizer securing means of the invention is shown in Figure 7 and is illustrative of one form of anchoring or mounting means for the stabilizer rods. Here a pin 312 extends through an aperture 313 in the end of the stabilizer rod and through a hole 314 in a bracket 315 which is shown integral with the frame 38. Preferably the end of the pin 312 receiving the stabilizer rod 50 is of reduced diameter so that a shoulder 316 is formed thereon. A retaining washer 317 engages with the pin and is held against shoulder 316 by the stabilizer rod while a second retaining washer 318 is pressed against the other side of the stabilizer rod by a nut 319. The pin is secured to the bracket 315 by a nut 321 and should be tapered inwardly towards the nut, as shown to aid in securing it in position. The stabilizer is finally positioned by a rubber bushing 322 which is formed in two similar sections, each having an edge flange 323. The rubber bushing 322 may be under slight compression initially, but in all cases it must snugly fill the entire space between the pin, retaining washers, and stabilizer rod. It will be observed that the bushing 322 contacts all three faces of the stabilizer rod adjacent the means mounting the rod and this permits slight universal movement of the stabilizer rod 50 with relation to the pin 312, while at the same time it offers but little resistance to appreciable oscillating movement of the stabilizer rod on the pin 312. Note that the rubber flanges 323 extend between the retaining washers and the stabilizer rod as this greatly facilitates the desired movement of the stabilizer rod 50. By splitting the rubber bushing 322, assembly of the mounting is simplified.

A bracket 310a which co-operates with the bracket 310 to secure the torque rods 36 to the axle 301 of the Hotchkiss drive unit of Figure 5 is shown in Figure 8. The brackets 310, 310a, having pairs of aligned holes 311 formed therein, are parallel and are welded or otherwise secured to the axle 301. Bolts 312a, carrying sleeves 313a, extend through the holes 311 and through outer sleeves 314a permanently secured in the torque rods 36. The sleeves 314a have a rubber bushing 315a vulcanized thereto which bushing is held against the sleeves 313a to retard relative movement between the axle and the torque rods. Conical sleeves 316a are carried by the sleeves 313a to aid in centering the torque rod between the brackets 310 and 310a and to compress the rubber bushings 315a.

Figure 9 shows in detail a modification of apparatus for securing the stabilizer rod 50 to a frame bracket 303. The stabilizer rod 50 carries a sleeve 304, which has a rubber bushing 305 vulcanized thereto, the bushing 305 retaining the sleeve 304 in the stabilizer rod 50 and being inserted therein under high compression. A bolt 306 extends through the sleeve 304 and bracket 303 to secure the end of the stabilizer rod in the bracket. It will be observed that the rubber sleeve 305 will permit a slight amount of relative universal movement between the bracket and the stabilizer rod while also centering the rod in the bracket.

Figures 10 and 11 disclose an embodiment of the invention in which the stabilizer rod of the invention is secured to the front axle of a vehicle. In this case, the torque rods 35 carry universal friction devices, which permit but frictionally resist universal movement, at their ends, spindles 126 of the friction devices securing the torque rods to the frame 38. The forward ends of the torque arms 35 are bifurcated and are secured to the front axle 280 by bolts 281. Rubber bushings (not shown) of the type shown in Figure 8 are placed between the torque arms 35 and the front axle so that the torque arms may move slightly with relation to the axle as the wheels vibrate in moving over a road. The bushings also absorb some of the road shocks carried to the axle 280. Pneumatic bellows 283, similar to the bellows 44, connect the axle 280 to the frame 38.

A substantially horizontal extending positioning or stabilizer rod 284 is connected between the axle 280 and the frame 38 to prevent relative lateral movement thereof. A pin, or bolt 285, extends through the stabilizer rod near one end thereof to connect it to the axle 280, the stabilizer rod being positioned for universal movement on the pin by a rubber bushing (see Figure 7) used in mounting the rod. A pin 286, suitably secured to a bracket (not shown) on the frame 38, is connected to the other end of the stabilizer rod so that the stabilizer rod is free for slight universal and substantial arcuate movement on the pin 286. This construction permits relative vertical movement of the axle and the frame and also slight arcuate movement of the wheel assembly on the torque rods 35.

A steering mechanism 288 connects to a conventional unitary wheel assembly 291 carried by the axle 280 through a transversely extending link 289 which is secured to the wheel assembly by a pivotal connection and to an arm 290 on the steering mechanism by a ball and socket joint. This joint permits relative universal movement between the frame and the wheel assembly. Apertures 35a are provided in the torque rods for passage of the link 289 and a transversely extending member on the wheel assembly. Figure 10 indicates that the lines XX and YY determined by the points on each side of the vehicle that are fixed as to relative movement between the frame and the axle, and the steering mechanism and the axle respectively, are parallel. That is, a line determined by the points of connection between the stabilizer rod 284 and the axle 280, and the wheel assembly 291 and the link 289 is parallel to the line determined by the points where the frame 28 is connected to the stabilizer rod 284, and the link 289 to the arm 290. This allows the wheel assembly to move vertically with relation to the frame without appreciably changing the steering plane of the wheels. The line also must pass substantially through the fixed pivotal connections between its associated torque rod 35 and the frame to aid in securing satisfactory steering regardless of the vertical relation of the running gear and frame. Also, the stabilizer rod 284 is parallel to the transverse link 289 to aid in permitting relative vertical movement of the running gear and frame without interference with the vehicle's steering.

Placing the bellows 283 and attaching the torque rods to the axle outside the frame 38 acts to give increased stabilization to the frame and best utilization of the friction devices. The rubber bushings between the torque rods 35 and the axle 280, resiliently resist angular movement of the axle with relation to the frame to minimize body roll.

Referring now to Figure 12 of the drawings, there is shown a vehicle suspension constituting another embodiment of the invention. Shown in the drawings is a vehicle frame 255 including cross braces 256, 256, and running gear comprising a live axle housing 257 including a torque tube 258 enclosing the driving shaft. The frame 255 is supported by the running gear of the vehicle through the agency of a pneumatic suspension system of which bellows members 259, 259 are an operative part, as previously explained with relation to other embodiments of the invention. Each bellows 259 is interposed between a side rail of the frame 255, and a torque rod 260 that is pivotally connected at one end to the axle housing 257, adjacent one end of the latter, the other end of said torque rod being pivotally connected to a cross-brace 256, forwardly of the axle housing. Relative movement between each torque rod 260 and the frame 255 is frictionally resisted by a friction connection 261 that is of the universal type, said connection being similar to that previously referred to (Figures 10 and 11). Relative movement between the axle housing 257 and each torque rod 260 is yieldingly resisted by a special pivotal connection therebetween, the construction of said connection being shown in greater detail in Figures 14 and 15. Although the members 260 are designated "torque rods," the construction is such that they transmit only thrust reactions, torque reactions being taken by the torque tube 258.

A universal joint connection is shown in Figure 13 and it is adapted for use where universal friction devices 261 are associated with the torque rods 260 as in Figure 12. Here the torque tube 221a surrounds the drive shaft 230a as usual while a sleeve 235b extending from universal joint housing member 235a is in telescopic relation with the torque tube. This member is received between the members 243a and 245a which are secured to the frame (not shown) in a suitable manner. In this instance, no friction material is provided between the member 235a and the members 243a and 245a, since the friction material is associated with the friction devices 261 of the rear axle suspension system. The sleeve 235b has annular bands of friction material 237a integrally bonded thereto by thin rubber layers 236a vulcanized to the sleeve. A connecting sleeve 232a extends rearwardly from the universal joint and it is slidably splined to the forward end of the drive shaft 230a. The connecting sleeve 232a has integral arms which form the driven part of the universal joint. A bronze bushing 238a is positioned between the connecting sleeve 232a and the sleeve 235b to retain these members in fixed relation and to journal the end of the drive shaft. Brass pins, or the like, 238b extend through the bushing 238a and the sleeve 235b to prevent relative rotation therebetween. An annular rubber boot 250a should be secured between the member 243a and the torque tube 221a by any suitable means to prevent entry of foreign material into the sleeve joint connection.

In operation, the drive shaft 230a and the connecting sleeve 232a from the universal joint are adapted to rotate as an integral member except that telescopic movement between the drive shaft and the connecting sleeve is permitted. The friction material carried by the sleeve 235b, which is associated with the frame 255, exerts a snubbing action on any telescopic or angular movement of the drive shaft as it is received in the torque tube 221a by a tight fit and since the tube moves integrally with the drive shaft whereby relative movement of these members is retarded.

The means for pivotally securing each torque rod 260 to the axle housing 257 are shown in Figures 14 and 15. These means include a pair of plates 270, 270 which are welded to the axle housing, said plates being spaced from each other in parallel relation with the axis of the housing being perpendicular to the plates. Below the axle housing the plates 270 are apertured to receive a bolt 271, the axis of which is parallel to the axis of said housing. Mounted upon the bolt 271 are two metal bushings 272, 272 that are in end to end relation, the outer or remote ends of the respective bushings being formed with outwardly extending circumferential flanges 273 that abut the adjacent faces of the plates 270. Circumscribing the bushings 272 is a sleeve of resilient rubber composition 274, the respective ends of which abut the flanges 273 of said bushings. Circumscribing the rubber sleeve 274 is a tubular metal sleeve 275 that is of somewhat shorter length than the rubber sleeve, and is formed on its inner circumference with a centrally disposed, inwardly extending circumferential flange 275a that extends into a similarly shaped groove formed in the periphery of the rubber sleeve. The metal sleeve 275 is mounted in the end portion of torque rod 260 and permanently secured thereto as by welding. The arrangement is such that when the bolt 271 is set up or tightened, the rubber sleeve 274 is placed under compressive stress of sufficient magnitude to prevent angular movement of the sleeve 275 relatively of the rubber, and to prevent angular movement of the rubber sleeve relatively of the bushings 272. Also there is sufficient friction between the bushings and the bolt 271, and bushing flanges 273 and plates 270, to prevent angular movement of the bushings relatively of the bolt. Thus upon relative movement of the vehicle frame 255 and torque arm 260, as indicated in broken lines in Figure 14, the torque arm will fulcrum about the bolt 271 as an axis, and apply torsional strain to the rubber sleeve 274, said relative movement being yieldingly resisted to some extent by the resistance of the rubber to torque. The major portion of the resistance to said relative movement is produced by the friction material carried by the universal friction device 261. This friction material is originally permanently lubricated so that it need not be lubricated after assembly and is backed up by a rubber layer whereby it can adapt itself to irregularities in any surface contacting it.

One of the plates 270 may be formed with a rearwardly extending, bracket-like portion 277, to the rear end of which one end of a stabilizer rod 278 is pivotally connected, said stabilizer rod extending transversely of the frame 255 of the vehicle and being pivotally connected to the latter on the side thereof remote from the bracket 277. The function of the stabilizer rod was explained with reference to previously described embodiments of the invention.

Note that applicant has provided a vehicle suspension system of the pneumatic type wherein the body is held against undesirable movement on the frame, although normal movement therebetween, occurring in passing over uneven surfaces, is permitted.

The invention provides stability to the vehicle body while maintaining the desirable low rate of the suspension at normal driving conditions, and achieves the other advantages set out in the foregoing statement of objects.

Other modification may be resorted to without departing from the spirit of the invention, or the scope thereof as defined by the appended claims.

What is claimed is:

1. In the suspension of a vehicle including running gear and a frame, the combination of mounting pins secured to said running gear and to said frame on opposite sides of the vehicle, a stabilizer rod having eyed ends engaging with and extending between said mounting pins to maintain the desired lateral relationship between said body and said frame, a split rubber bushing having flanged outer edges received on each of said mounting pins between said stabilizer rod and said mounting pins, said bushing being free, except for pressure on said bushing, to rotate on said pin, and means forcing said flanges against said stabilizer rod whereby slight universal movement of said stabilizer rod on said mounting pins is permitted due to the rubber used in mounting it.

2. In the suspension of a vehicle including running gear and a frame, the combination of means without lateral stability resiliently mounting said frame upon said running gear, mounting pins secured to said running gear and to said frame on opposite sides of the vehicle, a stabilizer rod having eyed ends engaging with and extending between said mounting pins to maintain the desired lateral relationship therebetween, a split rubber bushing having flanged outer edges received on each of said mounting pins between said stabilizer rod and said mounting pin with its flanges being adjacent the sides of said stabilizer rod, and means for forcing said flanges against the sides of said stabilizer rod whereby slight universal movement thereof on said mounting pins is permitted.

3. In the suspension of a vehicle including running gear and a frame, the combination of means without lateral stability resiliently mounting said frame upon said running gear, mounting pins secured to said running gear and to said frame on opposite sides of the vehicle, said mounting pins having a shoulder and a reduced diameter section at one end thereof, a backing plate received on said mounting pin and abutted against said shoulder, split rubber bushings having flanged edges associated with said mounting pins on the reduced sections thereof, a stabilizer rod having eyed ends received on said rubber bushings on said mounting pins and extending therebetween to maintain the frame and running gear in proper lateral relation, further backing plates associated with the outer portions of said mounting pins, and means for forcing said backing plates against opposite sides of said stabilizer rod, said rubber flanges extending between said rod and said plates whereby said stabilizer rod is resiliently mounted for limited universal movement.

4. In a vehicle, a frame, an axle having a wheel assembly movably associated therewith, resilient means operably associated between said axle and said frame to support said frame, steering means for said vehicle, a transversely extending link connecting said steering means to said wheel assembly, and a transversely extending stabilizer rod pivotally connected between said axle and said frame to control relative lateral movement therebetween, the line determined by the points of connection between said stabilizer rod and said axle, and said wheel assembly and said link being parallel to the line determined by the points of connection of said stabilizer rod and said frame, and said link and said steering means.

5. In a vehicle, a frame, an axle having a wheel assembly movably associated therewith, resilient load supporting means operably associated between said axle and said frame to support said frame, steering means for said vehicle, a transversely extending link connecting said steering means to said wheel assembly, and a transversely extending stabilizer rod pivotally secured between said axle and said frame to control relative lateral movement therebetween, both said stabilizer rod and said link extending substantially across said frame and having their respective end connections determining parallel lines.

6. In a vehicle, a frame, a front axle having a wheel assembly movably associated therewith, resilient means operably associated between said axle and said frame to support said frame, thrust means pivotally connected to said frame and extending to said axle to control relative movement therebetween, steering means for said vehicle, a transversely extending link connecting said steering means to said wheel assembly, and a transversely extending stabilizer rod pivotally connected between said axle and said frame to control relative lateral movement therebetween, the line determined by the points of connection between said stabilizer rod and said axle, and said wheel assembly and said link being parallel to the line determined by the points of connection of said stabilizer rod and said frame, and said link and said steering means, said last line substantially extending through one of the pivotal connections between said frame and said thrust means.

7. In a vehicle suspension, the combination of a frame or body, an axle housing, and torque rods having pivotal connection with said frame or body and with said axle housing, the latter connections comprising a web extending substantially radially from the axle housing parallel to the axis thereof, a bushing of rubber composition encircling the housing and web, and means for mounting the torque rod on said bushing such as to place the bushing under compressive stress, the web limiting angular movement of the torque rod relatively of the axle housing in one plane.

8. In a vehicle suspension, the combination of a frame or body, an axle housing, and a torque rod having pivotal connection with said frame or body and with said axle housing, the latter connection comprising a bracket-like structure secured to the axle housing and extending below the same, a bolt non-rotatably mounted therein on an axis parallel to the axle housing, and a rubber bushing carried by said bolt in non-rotatable relation thereto, said bushing being under compressive stress, said torque rod being mounted upon said bushing in frictional engagement therewith.

9. In a vehicle suspension, the combination of a frame or body of a vehicle, a running gear, arms extending generally longitudinally of the frame or body and connecting the same to the opposite lateral ends of said running gear, said arms having their corresponding ends pivotally connected to said frame or body at points displaced longitudinally of the vehicle from said running gear and on opposite sides of the center line, said arms being connected to said running gear by distortable resilient bushings rotatably mounted and under compression on pins projected from said frame or body, for resiliently opposing relative pivotal movements between said frame or body and said running gear along an axis generally longitudinal of the frame.

10. In a motor vehicle, in combination, a frame; a Hotchkiss type rear axle; a forwardly extending radius rod controlling the longitudinal position of said axle in relation to said frame, a pivotal connection between said rod and said frame, rubber lined connections between said rod and said axle yieldingly controlling the torque reaction of said axle, means controlling the lateral position of said axle in relation to said frame, and spring means between said frame and axle, resiliently resisting upward movement of said axle relatively to said frame.

11. The invention described in claim 10, wherein the spring means are seated on the radius rod.

12. Suspension means for a drive axle, comprising a frame, a Hotchkiss type power rear axle, springs between said axle and frame, means controlling the lateral position of said axle in relation to said frame, a pair of forwardly extending rigid distance rods with substantially universal connections at each end yieldingly resisting the torque reaction of said power axle connecting said axle to said frame.

13. The invention described in claim 12 wherein rubber linings form the substantially universal connections.

14. A substitution for a Hotchkiss drive automobile, comprising a frame, a Hotchkiss type power axle, a spring between said axle and frame, a distance rod between said frame and axle, and a connection including rubber in compression between said distance rod and axle as the sole means of yielding power transfer of said Hotchkiss drive.

15. Suspension means for a drive axle, comprising a frame including X members, an integral power axle, a propeller shaft, a single pair of independent diagonally disposed distance rods between said X members and power axle, rubber-lined connections between said axle and distance rods, rubber-lined connections between said distance rods and X members, said last mentioned connections in laterally spaced relation, whereby a space is created for the oscillation of said propeller shaft.

16. A substitution for a Hotchkiss drive, comprising a frame including X members, an integral power axle, propeller shaft means, a single pair of independent diagonally disposed distance rods between said X members and power axle, rubber-lined connections between said axle and distance rods, rubber-lined connections between said distance rods and X members, with said last mentioned connections in laterally spaced relation straddling said propeller shaft means.

17. In a motor vehicle, in combination, a frame; a Hotchkiss type rear axle; a pair of forwardly extending diagonally disposed distance rods controlling the longitudinal position of said axle in relation to said frame, pivotal connections between said rods and said frame, rubber lined connections between said rods and said axle yieldingly controlling the torque and brake reactions, means controlling the lateral position of said axle in relation to said frame, and spring means between said frame and axle, resiliently resisting upward movement of said axle relatively to said frame.

ROY W. BROWN.